(12) United States Patent
Desbois et al.

(10) Patent No.: US 9,834,885 B2
(45) Date of Patent: Dec. 5, 2017

(54) PROCESS FOR THE PRODUCTION OF A FIBER-REINFORCED COMPOSITE MATERIAL

(71) Applicant: BASF SE, Ludwigshafen (DE)

(72) Inventors: Philippe Desbois, Edingen-Neckarhausen (DE); Silke Biedasek, Mannheim (DE)

(73) Assignee: BASF SE (DE)

( * ) Notice: Subject to any disclaimer, the term of this patent is extended or adjusted under 35 U.S.C. 154(b) by 929 days.

(21) Appl. No.: 14/095,324

(22) Filed: Dec. 3, 2013

(65) Prior Publication Data

US 2014/0154937 A1  Jun. 5, 2014

Related U.S. Application Data

(60) Provisional application No. 61/732,961, filed on Dec. 4, 2012.

(51) Int. Cl.
| | |
|---|---|
| *C08J 5/04* | (2006.01) |
| *D06N 3/12* | (2006.01) |
| *C08J 5/24* | (2006.01) |

(52) U.S. Cl.
CPC ............. *D06N 3/125* (2013.01); *C08J 5/04* (2013.01); *C08J 5/043* (2013.01); *C08J 5/24* (2013.01); *C08J 2377/02* (2013.01); *Y10T 428/2933* (2015.01); *Y10T 442/198* (2015.04); *Y10T 442/20* (2015.04)

(58) Field of Classification Search
None
See application file for complete search history.

(56) References Cited

U.S. PATENT DOCUMENTS

| | | | |
|---|---|---|---|
| 5,837,181 A | 11/1998 | Leimbacher et al. | |
| 5,895,808 A | 4/1999 | Schmid et al. | |
| 2005/0214465 A1 | 9/2005 | Maskus et al. | |
| 2008/0020219 A1 | 1/2008 | Bouquerel et al. | |
| 2010/0215920 A1 | 8/2010 | Orange et al. | |
| 2011/0045275 A1* | 2/2011 | Tadepalli | C07F 7/1836 428/300.1 |
| 2012/0107509 A1* | 5/2012 | Scherzer | B29C 67/246 427/381 |
| 2012/0225995 A1 | 9/2012 | Desbois et al. | |
| 2012/0273984 A1 | 11/2012 | Desbois et al. | |
| 2012/0322326 A1* | 12/2012 | Orange | B29C 70/22 442/59 |
| 2013/0052444 A1 | 2/2013 | Scherzer et al. | |
| 2013/0053535 A1 | 2/2013 | Scherzer et al. | |

(Continued)

FOREIGN PATENT DOCUMENTS

| | | |
|---|---|---|
| DE | 19602638 A1 | 8/1997 |
| FR | 2864094 A1 | 6/2005 |

(Continued)

OTHER PUBLICATIONS

U.S. Appl. No. 61/732,961.

(Continued)

*Primary Examiner* — Erma Cameron
(74) *Attorney, Agent, or Firm* — Drinker Biddle & Reath LLP

(57) ABSTRACT

The present invention relates to a process for the production of a fiber-reinforced composite material with a polyamide matrix.

23 Claims, 1 Drawing Sheet

(56) References Cited

U.S. PATENT DOCUMENTS

| | | |
|---|---|---|
| 2013/0065466 A1 | 3/2013 | Desbois et al. |
| 2013/0079465 A1 | 3/2013 | Desbois et al. |
| 2013/0190454 A1 | 7/2013 | Desbois et al. |
| 2013/0221555 A1 | 8/2013 | Radtke et al. |
| 2013/0261282 A1 | 10/2013 | Biedasek et al. |
| 2013/0303758 A1 | 11/2013 | Lucas et al. |
| 2014/0008018 A1 | 1/2014 | Di Martino |

FOREIGN PATENT DOCUMENTS

| | | |
|---|---|---|
| FR | 2953847 A1 | 6/2011 |
| JP | H09202854 A | 8/1997 |
| WO | WO-03053661 A1 | 7/2003 |
| WO | WO-2008/155318 A1 | 12/2008 |
| WO | WO-2011/073200 A1 | 6/2011 |
| WO | WO-2012045806 A1 | 4/2012 |
| WO | WO-2012/117040 A1 | 9/2012 |
| WO | WO-2012/127029 A1 | 9/2012 |
| WO | WO-2012116947 A1 | 9/2012 |
| WO | WO-2012/146617 A1 | 11/2012 |
| WO | WO-2013/004645 A1 | 1/2013 |
| WO | WO-2013/026810 A1 | 2/2013 |
| WO | WO-2013/026820 A1 | 2/2013 |
| WO | WO-2013/030103 A1 | 3/2013 |
| WO | WO-2013/037716 A1 | 3/2013 |
| WO | WO-2013/045319 A1 | 4/2013 |
| WO | WO-2013/107765 A1 | 7/2013 |
| WO | WO-2013/144132 A1 | 10/2013 |
| WO | WO-2013/167404 A1 | 11/2013 |
| WO | WO-2014/086757 A2 | 6/2014 |

OTHER PUBLICATIONS

U.S. Appl. No. 61/473,828.
Japanese Office Action dated Aug. 21, 2017 for JP Patent Application No. 2015-545778.

* cited by examiner

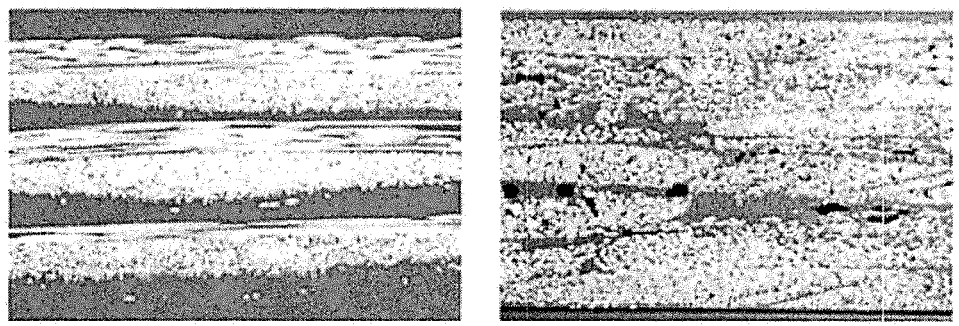

PROCESS FOR THE PRODUCTION OF A FIBER-REINFORCED COMPOSITE MATERIAL

BACKGROUND OF THE INVENTION

The present invention relates to a process for the production of a fiber-reinforced composite material with a polyamide matrix.

PRIOR ART

Composite materials which are composed of a reinforcing fiber structure and of an enclosing matrix made of a thermoplastic polymer and which can be subjected to a downstream thermal forming process have a wide variety of industrial applications. Composite products of this type with a polymer matrix completely enclosing the textile reinforcement feature good performance characteristics, such as dimensional stability, substantially constant properties (at least when moisture is excluded), and high resistance to aqueous systems, fats, oils, fuels, and alcohols, and are resistant to environmental effects, and generally also have adequate thermal stability. Industrial production of composite materials in essence uses pultrusion processes to produce continuous profiles, or uses compression processes in which a fiber material is impregnated by the polymer matrix and is subjected to shaping under pressure.

In one specific embodiment, production of composite materials uses what are known as "prepregs", in which the fiber material is saturated either with a reactive precursor suitable for the formation of the polymer matrix or with a thermoplastic, thus producing a semifinished fiber product which is then subjected to consolidation. The consolidation of the composite material generally takes place at elevated pressure and elevated temperature. If a reactive precursor has been used, partial or complete polymerization can take place here. Consolidation prevents or reduces formation of air inclusions and produces a good bond between the individual plies of reinforcement. Another term used for impregnated and consolidated fiber-reinforced composite materials which can be subjected to a downstream thermal forming process is "Organopanels". They can be subjected to a forming process for the production of the final product, optionally after prolonged storage.

If the matrix polymer used for the production of fiber-reinforced composite materials comprises a polyamide that has already polymerized to completion, a problem often encountered is high viscosity, i.e. low flowability of the polymer at the melting point. In order nevertheless to obtain products with good mechanical properties, it is necessary to use relatively high temperatures and/or relatively high pressures, and even then the residence times required for impregnation/saturation are relatively long. If impregnation of the reinforcing fibers is inadequate, the resultant composite materials have relatively poor mechanical properties. There is therefore a need for processes that are improved in these respects and that can produce fiber-reinforced composite materials with a polyamide matrix.

DE 196 02 638 A1 describes a process for producing composite materials which can be subjected to a downstream thermal forming process and which have a matrix made of polylactam enclosing the reinforcing fiber structure. An activator- and catalyst-containing mixture is used here under conditions under which anionic lactam polymerization takes place. While the lactam melt is still in a low-viscosity state it encloses and penetrates the reinforcing fiber structure, and subsequently in the polymerized and solid state it forms the polymer matrix of the composite material. Said matrix is thermoplastic, and makes it possible to subject the composite material to a downstream forming process. Since saturation is immediately followed by polymerization, the polymerization step restricts production rate, thus preventing effective mass production of components of organopanels.

WO 2003/053661 describes a process for the production of a composite material made of reinforcing materials and of a thermoplastic polyamide as matrix, via activated anionic lactam polymerization. This process uses a lactam melt activated for anionic polymerization to impregnate the reinforcing materials at a temperature at which the activated lactam melt in essence remains unpolymerized. The lactam melt activated for anionic polymerization is produced by firstly melting a lactam or lactam mixture to give a monomer melt. A liquid initiator which comprises activator and catalyst together in solution is admixed with the monomer melt in essence immediately prior to the process for impregnation of the reinforcing material. The impregnated reinforcing material is then heated and polymerized in a heating unit, without passage through a mold.

PCT/EP 2012/053246 describes a process for the production of flat fiber-reinforced semifinished products which comprises the following steps:
a) saturation of textile structures with a mixture comprising molten lactam, catalyst, and optionally at least one activator,
b) cooling of the saturated textile structures, and
c) further processing of the cooled, saturated textile structures to give a flat semifinished product.

Said document says that a foil can be applied to the upper side and underside of the saturated textile structure, or that this structure can be entirely welded into a foil. This is particularly necessary if the resultant semifinished product has not, or has not entirely, polymerized to completion, since the catalyst used for anionic lactam polymerization is generally susceptible to hydrolysis. Use of foil to enclose the semifinished product increases its capability for storage. To the extent that a lactam-containing semifinished product has not been welded into a foil, it is necessary according to the teaching of PCT/EP 2012/053246 to carry out further processing within five minutes in order to avoid undesired water absorption, the result of which is catalyst deactivation and then failure of the lactam to polymerize to completion in its entirety.

WO 2012/045806 describes a process for the production of a stable monomer composition comprising an initiator and a catalyst, alongside the lactam and/or lactone monomer. Said monomer composition can be obtained via melting and cooling of the components, a particularly decisive factor here being rapid crystallization of the monomers (lactam and/or lactone), and is initially stable with respect to polymerization. These monomer compositions can be stored for a number of months and used at a subsequent juncture for polyamide production. There is no description of any specific use for the production of a fiber-reinforced composite material, and specifically no description of any dry application process where the lactam still substantially takes the form of monomer.

PCT/EP 2012/062792 describes solid particles which comprise from 50 to 99.7 parts by weight of at least one lactam A), from 0.2 to 8 parts by weight of at least one activator (A), and from 0.1 to 3.6 parts by weight of at least one catalyst B). In a preferred method for producing these, components A), B), and (A), and optionally other components are mixed at a temperature in the range from the melting point of the highest-melting-point lactam monomer comprised in the mixture to 50° C. above the melting point of the highest-melting-point lactam monomer comprised in the mixture, the mixture is converted to droplet form, the resultant droplets are cooled to a temperature in the range from 10° C. to 100° C. below the melting point of the mixture, and the cooled mixture is optionally granulated. Again in this document there is no description of any use for the production of a fiber-reinforced composite material, and specifically no description of any dry application process.

There is still a need for improvement to the known processes for the production of fiber-reinforced composite materials made of a fiber material and of a mixture which comprises at least one lactam, at least one catalyst, and at least one activator.

The contact between the fiber material and the mixture that forms the matrix has hitherto been achieved exclusively by using a liquid mixture of lactam, catalyst, and activator. If the production of the fiber-reinforced composite material does not take place on the premises of the producer of the mixture of lactam, catalyst, and activator, but instead takes place at a factory that carries out further processing, said factory has to hold inventory of the apparatuses appropriate for liquefying the mixture that has been transported and stored in the solid state, before application to a fiber material.

If a lactam-containing melt is used for the saturation process, there is a prolonged period during which the activated lactam has to be handled within a temperature range within which significant polymerization can already take place. Melts of this type can moreover be adversely affected by humid conditions.

If a solution of lactam composition in an organic solvent is used, a problem that arises is the removal and reclamation/ disposal of the solvent after the application process.

If a low-viscosity liquid mixture of lactam, catalyst, and activator is used, there is also the risk that the fiber material does not absorb all of the lactam composition, and that the remainder has to be isolated and subjected to reclamation or disposal. The provision of a melt is also attended by increased apparatus cost to the end user.

There continues to be a need for a process that can produce a fiber-reinforced composite material with a polyamide matrix and which avoids the disadvantages of the processes known from the prior art.

Surprisingly, it has now been found that a solid polymerizable composition particularly advantageously suitable for the production of fiber-reinforced composite materials with a polyamide matrix comprises at least one lactam, at least one catalyst, and at least one activator, and is applied in solid, free-flowing form to the fiber material requiring reinforcement. It has moreover been found that specifically solid particles which preferably have an average diameter in the range from 1 to 2000 μm are suitable for use in said process.

SUMMARY OF THE INVENTION

The invention provides a process for producing a fiber-reinforced composite material with a polyamide matrix by
a) providing a solid polymerizable composition which comprises
  A) at least one lactam,
  B) at least one catalyst, and
  C) at least one activator selected from isocyanates, anhydrides, acyl halides, reaction products of these with A), and mixtures of these,
b) applying, in solid, free-flowing form, the polymerizable composition provided in step a) onto a fiber material,
c) subjecting the fiber material obtained in step b) with the applied polymerizable composition to treatment at elevated pressure and at a temperature at which the mixture of components A), B), and C) is flowable, where this encloses and penetrates the fiber material,
d) cooling the product obtained in step c).

DESCRIPTION OF THE FIGURE

The left-hand photograph in the FIGURE shows a transverse section of the fiber-reinforced composite material of comparative example 2, while the right-hand photograph shows a transverse section of the fiber-reinforced material of example 2 of the invention.

DESCRIPTION OF THE INVENTION

The process of the invention has the following advantages:

The solid polymerizable composition which is used in the invention and which already comprises the lactam monomer, the catalyst, and the activator, and also optionally other additives, can be applied directly in solid form to a fiber material, e.g. a textile backing, and then rendered flowable and distributed and optionally to some extent or entirely polymerized. It is therefore possible to provide, in a commercially available form, a single-component composition capable of storage. This can then be used at a processing factory for the production of fiber-reinforced composite materials, without any requirement for said factory to have apparatuses available for liquefaction.

The polymerizable lactam composition does not have to be liquefied for application to the fiber material, with strict temperature control so as to avoid any undesired polymerization prior to or during application.

There is no need for removal of any organic solvent, this being a requirement when application takes place from a solution.

There is no risk that the fiber material will not absorb all of the low-viscosity liquid mixture of lactam, catalyst, and activator, and that the remainder will have to be isolated and subjected to return or disposal.

Avoidance of the disadvantages associated with the use, as thermoplastic matrix polymer, of polyamides that have already polymerized to completion, an example being the need to use relatively high temperatures and/or relatively high pressures and/or relatively long residence times for the impregnation/saturation process.

The process of the invention permits complete impregnation of the reinforcing fibers in cost-effective production times, and the formation of products with good mechanical properties.

The process of the invention can produce fiber-reinforced composite materials with high content of fibers and, if present, of fillers.

The process of the invention for the production of fiber-reinforced composite materials via activated anionic lactam polymerization with use of a polymerizable composition as raw material features high efficiency in the use of energy and of time.

For the purposes of the present invention, the expression "solid polymerizable composition" means a composition which is solid at room temperature under standard conditions (20° C., 1013 mbar). It is preferable that the polymerizable composition used in the invention also remains solid at relatively high temperatures. It is preferable that the polymerizable composition used in the invention remains solid at a temperature of at least 50° C., particularly preferably at a temperature of at least 60° C.

For the purposes of the invention, the expression "melt" also covers liquid compositions which comprise at least one molten component and at least one other component dissolved therein, e.g. molten lactam A) with, dissolved therein, catalyst B) and activator C). For the purposes of the present invention, the expression "to melt" does not have a strict physicochemical meaning, but is also used synonymously with conversion to a flowable state.

For the purposes of the invention, the expression "melting point" also covers the transition from a (partially) solid, non-flowable state to the molten state, this being the transition also elsewhere termed hardening point.

A polymer is "dimensionally stable" when it is no longer flowable.

For the purposes of the invention, "semifinished products" or "organopanels" are impregnated and consolidated fiber-reinforced composite materials which can be subjected to a downstream thermal forming process. They can have been polymerized to completion in their entirety, or can still comprise polymerizable lactam A), and also catalyst B), and activator C), where these polymerize via thermal posttreatment.

For the purposes of the invention, the length of "short fibers" is from 0.1 to 1 mm, the length of "long fibers" is from 1 to 50 mm, and the length of "continuous-filament fibers" is greater than 50 mm. Continuous-filament fibers are used for the production of the fiber-reinforced composite materials in the form of a textile structure, e.g. in the form of woven fabric, knitted fabric, laid scrim, or nonwoven. Components using continuous-filament fibers generally achieve the best values for stiffness and for strength.

During the production of the polymerizable composition of the invention used in step a), and also during the production, in the invention, of the fiber-reinforced composite materials, it can be advantageous to minimize the content of components not involved in the production of the polymerizable composition or of the fiber-reinforced composite material. Among these are specifically water, carbon dioxide, and/or oxygen. In one specific embodiment, the components and apparatuses used are therefore in essence free from water, carbon dioxide, and/or oxygen. It is preferable to use an inert gas atmosphere for the storage of the components used, and/or during charging of material to the compression apparatus, and/or during polymerization. Examples of suitable inert gases are nitrogen and argon. In many instances there is no requirement for full inertization, and a sufficient procedure is merely to blanket the containers, molds, etc. used with an inert gas.

Step a)

The polymerizable composition provided in step a) preferably comprises from 50 to 99.7 parts by weight of at least one lactam A),
from 0.1 to 3.6 parts by weight of at least one catalyst B), and
from 0.2 to 8.0 parts by weight of at least one activator C), based on the total weight of the composition.

It is preferable to use a polymerizable composition which comprises, based on the total weight of the composition, from 70 to 98 parts by weight, particularly preferably from 80 to 95 parts by weight, of at least one lactam A).

It is preferable to use a polymerizable composition which comprises, based on the total weight of the composition, from 0.2 to 16 parts by weight, preferably from 2.4 to 8 parts by weight, particularly preferably from 3.2 to 5.6 parts by weight, of at least one activator (A).

It is preferable to use a polymerizable composition which comprises, based on the total weight of the composition, from 0.1 to 5.4 parts by weight, preferably from 0.54 to 3.6 parts by weight, particularly preferably from 0.64 to 3 parts by weight, of at least one catalyst B).

At room temperature, the polymerizable composition provided in step a) is stable and solid. In particular, the polymerizable composition used in the invention does not polymerize below the melting point of the lactam component, and is therefore stable with respect to undesired premature polymerization. The polymerizable composition used in the invention can be stored for a number of months and used at any desired juncture for production of polyamide.

Particularly suitable lactams are $\epsilon$-caprolactam, 2-piperidone ($\delta$-valerolactam), 2-pyrrolidone ($\gamma$-butyrolactam), caprylolactam, enantholactam, laurylolactam, laurolactam, and mixtures of these. Preference is given to caprolactam, laurylolactam, and mixtures of these. It is particularly preferable to use, as lactam, exclusively caprolactam or exclusively laurylolactam.

Suitable catalysts B) for use in the process of the invention are the familiar catalysts usually used for anionic polymerization.

Catalysts of this type are disclosed by way of example in Kunststoff-Handbuch [Plastics handbook], volume 3/4, Technische Thermoplaste, Polyamide [Engineering thermoplastics, Polyamides], Carl Hanser Verlag, Munich, Vienna, 1998, in particular p. 48 et seq. It is preferable that the catalyst B) is one selected from sodium caprolactamate, potassium caprolactamate, magnesium bromide caprolactamate, magnesium chloride caprolactamate, magnesium biscaprolactamate, sodium hydride, sodium, sodium hydroxide, sodium methanolate, sodium ethanolate, sodium propanolate, sodium butanolate, potassium hydride, potassium, potassium hydroxide, potassium methanolate, potassium ethanolate, potassium propanolate, potassium butanolate, and mixtures of these.

It is particularly preferable to use a catalyst B) selected from sodium hydride, sodium, and sodium caprolactamate. In particular, sodium caprolactamate is used as catalyst B). In one specific embodiment, a solution of sodium caprolactamate in caprolactam is used, e.g. Brüggolen® C10 from Brüggemann, which comprises from 17 to 19% by weight of sodium caprolactamate in caprolactam. Magnesium bromide caprolactamate, e.g. Brüggolen® C1 from Brüggemann, is in particular equally suitable as catalyst B).

The molar ratio of lactam A) to catalyst B) can vary widely, generally being from 1:1 to 10 000:1, preferably from 5:1 to 1000:1, particularly preferably from 1:1 to 500:1.

The polymerizable composition used in the invention comprises at least one activator C) for anionic polymerization.

Compounds suitable as activator C) are generally isocyanates, anhydrides, and acyl halides, and reaction products of these with the lactam monomer. Other examples of suitable activators are precursors which together with the lactam A)

form an activated lactam in situ, examples being N-acyllactams. The number of growing chains depends on the amount of activator.

Suitable activators C) are inter alia aliphatic diisocyanates, such as butylene diisocyanate, hexamethylene diisocyanate, octamethylene diisocyanate, decamethylene diisocyanate, undodecamethylene diisocyanate, dodecamethylene diisocyanate, methylenebis(cyclohexyl 4-isocyanate), isophorone diisocyanate, aromatic diisocyanates, such as tolylene diisocyanate, or methylenebis(phenyl 4-isocyanate), or polyisocyanates (e.g. isocyanates derived from hexamethylene diisocyanate), or allophanates (e.g. ethyl allophanate). In particular, mixtures of the compounds mentioned can be used as activator C).

Other suitable activators C) are aliphatic diacyl halides, such as butylenedioyl chloride, butylenedioyl bromide, hexamethylenedioyl chloride, hexamethylenedioyl bromide, octamethylenedioyl chloride, octamethylenedioyl bromide, decamethylenedioyl chloride, decamethylenedioyl bromide, dodecamethylenedioyl chloride, dodecamethylenedioyl bromide, 4,4'-methylenebis(cyclohexyloyl chloride), 4,4'-methylenebis(cyclohexyloyl bromide), isophorone dioyl chloride, isophorone dioyl bromide, and also aromatic diacyl halides, such as tolylmethylenedioyl chloride, tolylmethylenedioyl bromide, 4,4'-methylenebis(phenyl)acyl chloride, and 4,4'-methylenebis(phenyl)acyl bromide. In particular, mixtures of the compounds mentioned can be used as activator C).

Particular preference is given to a polymerizable composition where activator C) used comprises at least one compound selected from the group consisting of aliphatic diisocyanates, aromatic diisocyanates, polyisocyanates, aliphatic diacyl halides, and aromatic diacyl halides.

In one preferred embodiment, activator C) used comprises at least one compound selected from hexamethylene diisocyanate, isophorone diisocyanate, hexamethylenedioyl bromide, hexamethylenedioyl chloride, and mixtures of these. It is particularly preferable to use hexamethylene diisocyanate as activator C).

The activator C) can be used in solid form or in the form of solution. In particular, the activator C) can be used in solution in caprolactam. An example of a suitable activator C) is a caprolactam-blocked 1,6-hexamethylene diisocyanate. A solution of a caprolactam-blocked 1,6-hexamethylene diisocyanate in caprolactam is obtainable commercially as Brüggolen® C20 from Brüggemann.

The molar ratio of lactam A) to activator C) can vary widely, and is generally from 1:1 to 10 000:1, preferably from 5:1 to 2000:1, particularly preferably from 20:1 to 1000:1.

The solid polymerizable composition provided according to the invention in step a) can also comprise, alongside abovementioned components A), B), and C), another component selected from monomers, polymers, fillers, fibrous materials, and other additional substances.

The polymerizable composition can comprise, in addition to at least one lactam A), at least one monomer M) copolymerizable therewith. The monomer M) is preferably one selected from lactones and crosslinking agents. The monomer M) is preferably exclusively one selected from lactones. Examples of preferred lactones are ε-caprolactone and/or γ-butyrolactone.

The solid polymerizable composition provided according to the invention in step a) can comprise a crosslinking monomer M). A crosslinking monomer can be a compound comprising more than one group that can be copolymerized with the lactam monomer. Examples of groups of this type are epoxy, amine, carboxyl, anhydride, oxazoline, carbodiimide, urethane, isocyanate, and lactam groups. Examples of suitable crosslinking monomers M) are amino-substituted lactams, such as aminocaprolactam, aminopiperidone, aminopyrrolidone, aminocaprylolactam, aminoenanthlactam, aminolaurolactam, aminolauryllactam, and mixtures of these, preference being given to aminocaprolactam, aminopyrrolidone, and mixtures of these, and particular preference being given to aminocaprolactam.

It is preferable that the amount of monomer M) is at most 40% by weight, based on the total weight of the monomers used for polymerization. It is preferable that the content of monomer M) is from 0 to 30% by weight, particularly preferably from 0.1 to 20% by weight, based on the total weight of the monomers used for polymerization.

In one preferred embodiment, the solid polymerizable composition comprises exclusively lactams A) as monomers.

The polymerizable composition can comprise one or more polymers. The polymer can in principle be one selected from polymers which are obtained during polymerization of the inventively polymerizable composition, polymers different from these, and polymer blends.

It is preferable that the polymerizable composition provided in step a) comprises, based on the total weight of the composition, from 0 to 40% by weight, particularly preferably from 0 to 20% by weight, in particular from 0 to 10% by weight, of the polymers that are obtained during polymerization of the lactams A) comprised in the composition and, if present, monomers M). The expression polymers here also includes oligomeric compounds.

The polymerizable composition provided in step a) can moreover comprise polymers intentionally added to the composition. It is preferable that the polymerizable composition provided in step a) comprises, based on the total weight of the composition, from 0 to 40% by weight, particularly preferably from 0 to 20% by weight, in particular from 0 to 10% by weight, of added polymers. If the polymerizable composition comprises at least one added polymer, the amount thereof is preferably at least 0.1% by weight, particularly preferably 0.5% by weight, based on the total weight of the polymerizable composition. In one specific embodiment, the polymerizable composition comprises none of the polymer formed during polymerization of the polymerizable composition used in the invention. In another specific embodiment, the polymerizable composition comprises no added polymer.

The polymerizable composition can comprise one or more polymers which are preferably added in the form of a polymer to the composition. In one first embodiment, the added polymer comprises groups which are suitable for forming block copolymers and/or graft copolymers with the polymers formed from the lactam monomers. Examples of groups of this type are epoxy, amine, carboxyl, anhydride, oxazoline, carbodiimide, urethane, isocyanate, and lactam groups.

In another embodiment, the polymerizable composition comprises at least one added polymer selected from polystyrene, styrene copolymers, polyphenylene oxide ethers, polyolefins, polyesters, polyethers, polyetheramines, polymers made of monomers containing vinyl groups, and mixtures of the polymers mentioned. In one preferred embodiment, the polymerizable composition comprises at least one polymer selected from styrene-acrylonitrile copolymers (SAN), acrylonitrile-butadiene-styrene copolymers (ABS), styrene-butadiene copolymers (SB), polyethylene (HTPE (high-temperature polyethylene), LTPE (low-temperature polyethylene)), polypropylene, poly-1-butene, polytetrafluoroethylene, polyethylene terephthalate (PET), polyamides, polyethylene glycol (PEG), polypropylene glycol, polyether sulfones (PESU or PES), polyvinyl chloride, polyvinylidene chlorides, polystyrene, impact-modified polystyrene, polyvinylcarbazole, polyvinyl acetate, polyvinyl alcohol, polyisobutylene, polybutadiene, polysulfone, and mixtures of these. These serve by way of example to improve the properties of the product, compatibilities of the components, and viscosity.

In one suitable embodiment, the polymerizable composition provided in step a) comprises at least one filler and/or fibrous material. For the purposes of the invention, the expressions "filler" and "fibrous material" have wide meaning and comprise by way of example particulate fillers and fibrous materials, and any possible transitional forms. Particulate fillers can have a wide range of particle sizes, extending from dust-like particles to coarse-grain particles. Filler material that can be used comprises organic and inorganic fillers and/or organic and inorganic fibrous materials. By way of example, the following can be used: inorganic fillers, such as kaolin, chalk, wollastonite, talcum powder, calcium carbonate, silicates, titanium dioxide, zinc oxide, graphite, glass particles, e.g. glass beads, nanoscale fillers, such as carbon nanotubes, carbon black, nanoscale and other phyllosilicates, nanoscale aluminum oxide ($Al_2O_3$), nanoscale titanium dioxide ($TiO_2$), graphene, and nanoscale silicon dioxide ($SiO_2$).

It is moreover possible to use one or more fibrous materials. These are preferably selected from known inorganic reinforcing fibers, such as boron fibers, glass fibers, carbon fibers, silica fibers, ceramic fibers, and basalt fibers; organic reinforcing fibers, such as aramid fibers, polyester fibers, nylon fibers, polyethylene fibers, and natural fibers, such as wood fibers, flax fibers, hemp fibers, and sisal fibers.

Particular preference is given to the use of glass fibers, carbon fibers, aramid fibers, boron fibers, metal fibers, or potassium titanate fibers. Specifically, chopped glass fibers are used. The fibers mentioned are preferably used in the form of short fibers in the polymerizable composition. The average fiber length of the short fibers here is preferably in the range from 0.1 to 0.4 mm. It is also possible to use fibrous materials in the form of long fibers or continuous-filament fibers. However, these fiber materials are generally not used in the polymerizable composition provided in step a), but instead are used only in the form of the fiber material used for the production of the fiber-reinforced composite material of the invention.

In particular, it is also possible to use mixtures of the fillers and/or fibrous materials mentioned. A particularly preferred filler and/or fibrous material used is glass fibers and/or glass particles, in particular glass beads.

The polymerizable composition provided in the invention in step a) preferably comprises from 0 to 90% by weight, in particular from 1 to 80% by weight, based on the total weight of the polymerizable composition, of at least one filler and/or fibrous material. In one specific embodiment, the polymerizable composition used in the invention comprises from 30 to 50% by weight, based on the total weight of the polymerizable composition, of at least one filler and/or fibrous material. In another specific embodiment, the polymerizable composition used in the invention comprises from 50 to 90% by weight, based on the total weight of the polymerizable composition, of at least one filler and/or fibrous material.

In particular, the polymerizable composition provided in step a) comprises no fillers and no fibrous materials.

In one preferred embodiment, the polymerizable composition provided in step a) can comprise at least one other additional substance. Preference is given to amounts of from 0 to 5% by weight of the additional substances, based on the total weight of the polymerizable composition, preferably from 0 to 4% by weight, based on the total weight of the polymerizable composition, particularly preferably from 0 to 3.5% by weight, based on the total weight of the polymerizable composition. Examples of additional substances that can be added are light stabilizers, PVC stabilizers, and other stabilizers, for example copper salts, dyes, antistatic agents, release agents, antioxidants, lubricants, flame retardants, blowing agents, impact modifiers, nucleating agents, and combinations. If the polymerizable composition comprises at least one additional substance, the amount thereof is preferably 0.01% by weight, based on the total weight of the polymerizable composition, particularly preferably at least 0.1% by weight, based on the total weight of the polymerizable composition, in particular 0.5% by weight, based on the total weight of the polymerizable composition.

It is preferable that the polymerizable composition used in the invention comprises an impact modifier as additional substance. If impact modifier used comprises a polymeric compound, this is considered to be part of the abovementioned polymers. In particular, impact modifier used comprises a polydiene polymer (e.g. polybutadiene, polyisoprene). These preferably comprise anhydride groups and/or epoxy groups. In particular, the glass transition temperature of the polydiene polymer is below 0° C., preferably below −10° C., particularly preferably below −20° C. The polydiene polymer can be based on a polydiene copolymer with polyacrylates, with polyethylene acrylates, and/or with polysiloxanes, and can be produced by the familiar processes (e.g. emulsion polymerization, suspension polymerization, solution polymerization, gas-phase polymerization).

It is preferable that the solid polymerizable composition is provided continuously in step a).

It is preferable that, for the provision of the solid polymerizable composition in step a), components A), B), and C) are combined in liquid form at elevated temperature, the combined components are mixed, and then the mixture is hardened by cooling.

The polymerizable composition provided in step a) can comprise other components in addition to components A), B), and C). With regard to suitable and preferred other components, reference is made to what has been said above in relation to these components. For conversion to the liquid phase, components A), B), and C) are heated to a temperature which is the same as or above the melting point of a mixture composed only of components A), B), and C). Even if the polymerizable composition provided in step a) comprises other components in addition to components A), B), and C), this ensures that distribution of components A), B), and C) in the resultant mixture is in essence homogeneous.

In one specific embodiment, the solid polymerizable composition provided in step a) is composed only of components A), B), and C). For the purposes of the invention, a composition composed only of components A), B), and C) can comprise the usual amounts of usual components present as a result of the production process. Among these are by way of example polymeric components derived from the monomers used, and usual contaminants. However, the intentional addition of other components different from components A), B), and C) is excluded. Among these are by way of example the abovementioned fillers, fibrous materials, etc.

The time from the formation of the combined mixture of components A), B), and C) to hardening is preferably at most 10 minutes, preferably at most 5 minutes, in particular at most 1 minute.

The time from the formation of the combined mixture of components A), B), and C) to hardening is preferably from 1 millisecond to 10 minutes, with preference from 2 milliseconds to 5 minutes, in particular from 5 milliseconds to 1 minute.

The temperature of the combined mixture of components A), B), and C) is preferably at most 20° C., particularly preferably at most 10° C., in particular at most 5° C., specifically at most 1° C., above the melting point of said mixture.

By virtue of the measures described above it is possible to ensure that the lactam A) and, if present, other monomers (M) in essence do not polymerize. It is preferable that the conversion of the lactam A) in the reaction and, if present, other monomers (M) in the reaction, during the time from formation of the combined mixture of components A), B), and C) to hardening is from 0 to 50%, particularly preferably from 0 to 30%, in particular from 0 to 15%.

In one preferred embodiment of the process of the invention, in order to provide the polymerizable composition in step a),
  components A), B), and C) are separately melted and combined, or
  a first melt made of the catalyst B) and of at least one lactam A), a second melt made of the activator C) and of at least one lactam A), and optionally, in addition, a third melt made of at least one lactam A) are combined,
the combined components are mixed, and then the mixture is hardened by cooling.

The mixing of the components can take place batchwise or continuously. The person skilled in the art is aware of suitable apparatuses for the mixing of the components. Among these are by way of example stirred tanks, kneaders, and extruders. The temperature of the mixing apparatus can preferably be controlled. The components can by way of example be mixed continuously and/or batchwise in a stirred tank. The components can by way of example be mixed continuously in an extruder.

After the components have been mixed, it is preferable that the mixture is cooled as quickly as possible. In particular, the cooling of the resultant mixture to a temperature in the range of from 100° C. below the melting point of the mixture to 10° C., preferably 30° C., below the melting point of the mixture takes place within a period in the range from 1 millisecond to 10 minutes, preferably in the range from 1 millisecond to 5 minutes, particularly preferably in the range from 1 millisecond to 1 minute, very particularly preferably in the range from 1 millisecond to 10 seconds. In particular, the mixture can be cooled by a cold gas stream (e.g. a nitrogen gas stream at 0° C.) or by what is known as a "cold-disk process".

The solid polymerizable composition provided in step a) of the process of the invention can comprise particles of any size and shape. The shape of the particles is preferably spherical or almost spherical (these being known as prills). However, the shape can also be that of powder particles, flakes, or what are known as pellets.

The polymerizable composition provided in step a) preferably takes the form of particles. The average diameters of the particles are generally from 1 to 2000 μm, preferably from 10 to 1000 μm, particularly preferably from 50 to 500 μm, very particularly preferably from 100 to 200 μm. The average diameter here can be determined via light scattering or via sieve fractions, and is the volume-average diameter.

In one preferred embodiment of step a) of the process of the invention, the liquid mixture of components A), B), and C) is hardened by known processes to give granules or flakes.

In another preferred embodiment of step a) of the process of the invention, the liquid mixture of components A), B), and C) is molded by known pelletizing processes to give pellets.

In one particularly preferred embodiment of step a) of the process of the invention, the liquid mixture of components A), B), and C) is converted to discrete droplets, and these are then hardened. To this end, the liquid mixture of components A), B), and C) can by way of example be dropletized or sprayed by way of a nozzle into a container. The cooling and the solidification of the mixture in droplet form (i.e. to give spherical particles) generally takes place while the droplets are falling within the container. To this end, the temperature of the container is below the melting point of the mixture of components A), B), and C). In addition, a gas stream can flow as coolant through the container. In another suitable embodiment, there is a bath containing a suitable coolant liquid at the lower end of the drop tube.

In one particularly preferred embodiment of step a) of the process of the invention, the liquid mixture of components A), B), and C) is converted to the droplet form in a prilling process and hardened to give spherical particles. The conduct of the entire process here is such that the residence time of combined components A), B), and C) in the liquid phase, i.e. up to hardening via prilling, is minimized. Processes and apparatuses for prilling are known in principle and are described by way of example in DE102007032778A1. A suitable prilling apparatus comprises by way of example at least two melt containers, conversion of components A), B), and C) to the liquid state, a dropletizer for forming droplets from the molten material, a drop tube, and cooling equipment. It is preferable that at least one of the components is converted separately to the liquid state, i.e. that the liquid mixture of all three components A), B), and C) is produced only immediately prior to entry into the dropletizer.

In another preferred embodiment of step a) of the process of the invention, the liquid mixture of components A), B), and C) is in an apparatus also suitable for spray drying when it is converted to the droplet form, and is hardened to give spherical particles. Apparatuses of this type are described by way of example in K. Masters, Spray Drying Handbook, 5th edition, Longman, 1991, pp. 23-66.

The particulate solid polymerizable composition is preferably produced by using an apparatus having temperature-controllable feed vessels and temperature-controllable metering lines.

The conversion in the reaction prior to conversion to the droplet form can be adjusted to from 0 to 50%, preferably from 0 to 30%, particularly preferably from 0 to 10%, by way of the residence time between the mixing location where the reactive mixture is first present and the nozzle, and also by way of the temperature control in the hold-up section.

The process of the invention can use one or more spray nozzles. There is no restriction on the spray nozzles that can be used. The liquid requiring spraying can be introduced under pressure into nozzles of this type. The comminution of the liquid requiring spraying here can result from depressurization of the liquid after it has reached the certain minimum velocity in bore of the nozzle. It is also possible to use single-fluid nozzles for the purposes of the invention, examples being slot nozzles, or centrifugal chambers (solid-comb nozzles) (for example from Düsen-Schlick GmbH, DE, or from Spraying Systems Deutschland GmbH, DE).

Throughput per spray nozzle is advantageously from 0.1 to 10 m³/h, frequently from 0.5 to 5 m³/h.

The process can also be carried out in apparatuses in which the reactive mixture can drop under gravity in the form of monodisperse droplets. The apparatuses described by way of example in U.S. Pat. No. 5,269,980 are suitable for this purpose.

It is also possible to carry out dropletization via laminar breakdown of a jet, as described in Rev. Sci. Instr. 38 (1967) 502.

However, the droplets can also be produced by means of pneumatic drawing dies, rotation, section of a jet, or rapid-response microvalve dies.

In a pneumatic drawing die, a jet of liquid is accelerated together with a gas stream through an aperture. The diameter of the jet of liquid, and thus the diameter of the droplets, can be influenced by way of the amount of gas used.

In the case of droplet production via rotation, the liquid passes through the openings in a rotating disk. The centrifugal force acting on the liquid disentrains droplets of defined size. Preferred apparatuses for rotation dropletization are described by way of example in DE 43 08 842 A1.

However, it is also possible to use a rotating blade to section the emerging jet of liquid into defined segments. Each segment then forms a droplet.

When microvalve dies are used, droplets with defined liquid volume are produced directly.

The average diameter of the discrete droplets produced is generally from 1 to 2000 μm, preferably from 10 to 1000 μm, particularly preferably from 50 to 500 μm, very particularly preferably from 100 to 200 μm, where the diameter of the droplets can be determined by light scattering, and is the volume-average diameter.

A gas can flow through the container in which the droplets are hardened. The carrier gas here can be conducted cocurrently or countercurrently with respect to the monomer mixture droplets falling under gravity through the reaction space, and is preferably conducted cocurrently, i.e. downward. It is preferable that, after passage of the gas, it is at least to some extent returned to the reaction space, preferably to an extent of at least 50%, particularly preferably to an extent of at least 75%, in the form of a gas circuit. A portion of the carrier gas is usually discharged after each pass, preferably up to 10%, particularly preferably up to 3%, very particularly preferably up to 1%.

The oxygen content of the carrier gas is preferably at most 15% by volume, particularly preferably at most 5% by volume, very particularly preferably at most 0.1% by volume.

The carrier gas preferably comprises, alongside oxygen, an inert gas, particularly preferably nitrogen. The inert gas content of the carrier gas is preferably at least 80% by volume, particularly preferably at least 90% by volume, very particularly preferably at least 95% by volume.

The gas velocity is preferably adjusted in such a way that the flow within the reactor is oriented flow, where for example there are no convection vortices opposed to the general direction of flow, and this velocity is by way of example from 0.01 to 5 m/s, preferably from 0.02 to 4 m/s, particularly preferably from 0.05 to 3 m/s, very particularly preferably from 0.1 to 2 m/s.

The reaction can be carried out at superatmospheric pressure or at subatmospheric pressure, preference being given to superatmospheric pressure which is above ambient pressure by up to 100 mbar.

In one preferred embodiment, the provision of the polymerizable composition in step a) comprises the following steps:
a1) mixing of components A), B), and C) and optionally at least one other component at a temperature which is the same as or higher than the melting point of a mixture composed only of components A), B), and C),
a2) conversion of the mixture into droplet form,
a3) cooling of the droplets obtained in step a2) to a temperature at least 10° C. below the melting point of the mixture;
a4) optionally granulation of the cooled mixture.

In relation to suitable and preferred embodiments of steps a1) to a4), reference is made to what has been said above in relation to these process measures.

Step b)

In step b) of the process of the invention, the polymerizable composition provided in step a) is applied in solid, free-flowing form onto a fiber material.

It is preferable that step b) uses a fiber material which comprises continuous-filament fibers or is composed of continuous-filament fibers.

It is preferable that the fiber material used in step b) is one selected from fiber bundles, woven fabrics, knitted fabrics, laid scrims, and nonwovens made of continuous-filament fibers.

Preference is given to use of parallel-fiber fiber bundles. Resin-saturated fiber bundles are also termed "rovings". Fiber materials made from the consolidation of parallel-fiber fiber bundles in which the fibers are in essence in unidirectional arrangement are also termed "tapes".

Suitable fiber materials are single- or multiple-ply woven fabrics, single- or multiple-ply knitted fabrics, single- or multiple-ply braids, single- or multiple-ply laid scrims, and single- or multiple-ply nonwovens.

Suitable laid scrims have at least one ply, preferably a plurality of plies, made of parallel-oriented fibers, yarns, threads, or cordage, where the individual plies of the parallel-oriented fibers, yarns, threads, or cordage can be mutually nonparallel.

The fiber materials preferably take the form of woven fabrics or take the form of laid scrims made of plies of parallel-oriented fibers, yarns, threads, or cordage.

It is preferable to use woven fabrics composed of two or more than two plies.

If in the case of laid scrims the plies of parallel-oriented fibers, yarns, threads, or cordage are used in mutually nonparallel form, it is particularly preferable that the angle of rotation between the individual plies is respectively 90° (bidirectional structure). If the number of plies used is three or a multiple of three, it is also possible to arrange the angle of rotation between the individual plies to be 60°, and if the number of plies is four or a multiple of four it is also possible to arrange the angle of rotation between the individual plies to be 45°. It is moreover also possible to provide more than one ply of fibers with identical orientation. It is also possible here that plies are mutually nonparallel, where the number of plies with fibers of identical orientation in each of the orientations of the fibers can differ, an example being four plies in one first direction and one ply in a direction where the angle of rotation between these directions is, for example, 90° (bidirectional structure with preferential direction). There is also a known quasi-isotropic structure in which the arrangement has the fibers of a second ply with an angle of rotation of 90° between these and fibers of a first ply, and moreover has fibers of a third ply with an angle of rotation of 45° between these and the fibers of the second ply.

It is particularly preferable to use, for production of the fiber-reinforced composite materials, fiber materials having from 2 to 10 plies, in particular having from 2 to 6 plies.

The fiber materials used preferably comprise, as fibers, fibers made of inorganic minerals, such as carbon, for example in the form of low-modulus carbon fibers or high-modulus carbon fibers, silicatic and non-silicatic glasses of a very wide variety of types, boron, silicon carbide, potassium titanate, metals, metal alloys, metal oxides, metal nitrides, metal carbides, and silicates, and also organic materials, such as natural and synthetic polymers, e.g. polyacrylonitriles, polyesters, ultrahigh-draw polyolefin fibers, polyamides, polyimides, aramids, liquid-crystal polymers, polyphenylene sulfides, polyether ketones, polyether ether ketones, polyetherimides, cotton, cellulose, and other natural fibers, such as flax, sisal, kenaf, hemp, and abaca. Preference is given to high-melting-point materials, such as glasses, carbon, aramids, potassium titanate, liquid-crystal polymers, polyphenylene sulfides, polyether ketones, polyether ether ketones, and polyetherimides, and particular preference is given to glass fibers, carbon fibers, aramid fibers, steel fibers, potassium titanate fibers, ceramic fibers, and/or other sufficiently heat-resistant polymeric fibers or filaments.

The solid polymerizable composition is preferably applied to the fiber material via a scattering process, in particular a continuous scattering process. Suitable apparatuses for the scattering process are metering rolls, vibratory chutes, and pneumatic scattering processes. Processes of this type are described in M. Ostgathe et al., Organobleche aus Thermoplastpulver [Organopanels made of powdered thermoplastic], Kunststoffe, 1996, 86(12), pp. 1838-1840, the entire content of which is incorporated herein by way of reference. A process for the continuous production of organopanels with the aid of scattering equipment has been described in K. Spindler, Kontinuierliches Streuen and Verpressen [Continuous scattering and pressing], Kunststoffe, 1995, 85(9), pp. 1364-1368, the entire content of which is likewise incorporated herein by way of reference.

In one specific embodiment, the fiber material provided in step b) is subjected to preheating before application of the polymerizable composition. Said preheating preferably takes place to a temperature at which the mixture of components A), B), and C) undergoes at least superficial incipient melting. Adhesion on the fiber material is thus improved.

Step c)

In step c) of the process of the invention, the fiber material obtained in step b) with the applied polymerizable composition is subjected to a treatment at elevated pressure and at a temperature at which the mixture of components A), B), and C) is flowable, where this encloses and penetrates the fiber material. The components forming the polymer matrix here penetrate into the fiber interstices and wet the reinforcing filaments. The treatment under increased pressure serves by way of example to consolidate the composite material, prevents or reduces formation of air inclusions, and produces a good bond between the individual plies of reinforcement.

In step c), the treatment of the fiber material with the applied polymerizable composition at elevated temperature and the treatment under increased pressure can take place in succession, to some extent simultaneously, or entirely simultaneously. In one first embodiment, the fiber material with the applied polymerizable composition is subjected simultaneously to treatment at elevated temperature and under elevated pressure. In a second embodiment, the fiber material with the applied polymerizable composition is first subjected to treatment at elevated temperature, in order to invert the mixture of components A), B), and C) to the flowable state. Treatment under elevated pressure then takes place. It is preferable that the treatment that follows, under elevated pressure, also simultaneously takes place at elevated temperature.

In one first preferred embodiment, the treatment in step c) takes place under conditions under which the lactam A) in essence polymerizes to completion (variant 1).

In this first variant, the treatment in step c) takes place for a sufficient time at a temperature above the polymerization temperature. The temperature required for polymerization and the required reaction time at this temperature depend inter alia on the lactam A) used. It is preferable that the temperature is in the range from 80 to 250° C., particularly in the range from 90 to 200° C., in particular in the range from 100 to 170° C. In particular, the temperature for the use of caprolactam as lactam component A) is in the range from 85 to 200° C., in particular from 90 to 170° C.

In this first variant it is preferable that the product obtained in step c) has at most 5% by weight residual content of lactam A), particularly at most 2.5% by weight, in particular at most 1% by weight, based on the weight of the lactam A) in the polymerizable composition used in step a).

In a second preferred embodiment, the treatment in step c) takes place under conditions under which the lactam A) does not in essence polymerize to completion (variant 2).

In this second variant it is preferable that the treatment in step c) takes place at a temperature that is from 1 to 20° C., particularly from 3 to 15° C., in particular from 5 to 10° C., above the melting point of the mixture of components A), B), and C).

The content of polymeric components in the product obtained in step c) is preferably at most 50% by weight, particularly preferably at most 30% by weight, in particular at most 15% by weight, based on the total weight of the polymerizable compounds in the solid polymerizable composition used in step a). Polymerizable compounds are the lactam A) and, if present, the other monomers (M).

In one specific embodiment, the fiber material obtained in step b) with the applied polymerizable composition is first subjected to preheating in step c). This preheating preferably takes place at a temperature at which the mixture of components A), B), and C) is flowable. The maximum permissible temperature depends on whether the lactam A) is already to be subjected to polymerization in step c) or not. In one specific embodiment, the preheating takes place under conditions under which the mixture of components A), B), and C) is flowable but the lactam A) in essence does not polymerize. The heating can be achieved by conventional methods known to the person skilled in the art, e.g. plates heated by a heating medium, via infrared sources, etc. It is preferable that a web of the fiber material with the applied polymerizable composition is conducted continuously past the heating apparatus.

Equipment suitable for the treatment of the fiber material obtained in step b) with the applied polymerizable composition under elevated pressure comprises the presses conventionally used for this purpose. The nature of the selected apparatus depends on whether the pressure treatment is intended to take place continuously or batchwise, and on whether the resultant product is intended to be subjected directly to shaping. Examples of suitable presses that operate batchwise are multi-daylight presses, autoclave presses, etc. It is preferable that the pressure treatment in step c) takes place continuously. Examples of suitable presses that operate continuously are twin-belt presses. Among these are by way of example ContiLam twin-belt presses from Kurt Held GmbH, Trossingen, Germany, where these operate in a continuous process. The temperature of the press can be controlled by way of heating and cooling units attached within the press.

The pressure during the treatment in step c) is preferably in the range from 5 to 300 bar, particularly from 7 to 200 bar, in particular from 10 to 100 bar.

Step d)

After step c) according to the invention, the resultant product is cooled (=step d)). For this, the product is generally cooled to a temperature at which the matrix formed in step c) is dimensionally stable. This "solidification" gives a useful composite material which can then be subjected to further processing. It is preferable that the product from step c) is cooled to a temperature of from 0 to 80° C., particularly to from 10 to 70° C., in particular to from 20 to 60° C.

In one suitable embodiment, the product obtained in step c) is subjected to cooling in the press apparatus. This can be achieved via suitable cooling apparatuses, and by way of example the product can be brought into contact with at least one cooled roll.

In another suitable embodiment, the product obtained in step c) is removed from the press apparatus for cooling. In one suitable embodiment, the cooling of the product is achieved by bringing it into contact with a coolant, e.g. a gas stream, which in addition can have been cooled. Suitable gases are air, inert gases, and air/inert gas mixtures. The cooling process ends when the product is dimensionally stable. The product can then be subjected to further processing, as described below.

The process of the invention, comprising steps a) to d), gives impregnated and consolidated fiber-reinforced composite products which can be subjected to a downstream thermal forming process. They can have been polymerized to completion in their entirety (variant 1), or can still comprise polymerizable lactam A), and also catalyst B), and activator C), where these polymerize via thermal posttreatment (variant 2). In every case, "semifinished products" or "organopanels" are obtained, and are advantageously suitable for further processing to give fiber-reinforced polyamide moldings.

To the extent that the product obtained still comprises polymerizable lactam A), and also catalyst B), and activator C), it is advantageous that, because the catalyst is water-sensitive, the semifinished product is produced and stored with exclusion of water, i.e. under dry air or an anhydrous inert gas, or that it is further processed as quickly as possible. As an alternative to this, the durability of the semifinished product can be improved by welding it within a foil or at least covering its upper side and underside with a foil. Foil used, into which the semifinished product is welded, can be any desired foil that is impermeable to water. It is preferable to use polyamide foils or polyester foils. If foils made of a material different from the polyamides and from polyesters is used, it is generally necessary to remove the semifinished product from the foil before further processing. If a polyamide foil is used, and optionally also if a polyester foil is used, the semifinished product can generally be further processed together with the foil, and does not have to be removed.

Step e)

The product obtained in step d) can optionally be subjected to specific mechanical processes before it is subjected to a forming process. For the purposes of the invention, specific mechanical processes are any type of division, including division into lengths, or establishment of dimensions and final sections that are specific to an application. The specific mechanical processes can use processes known to the person skilled in the art, e.g. sawing, cutting, milling, turning, grinding, drilling, etc.

Step f)

The product obtained in step d) or the product obtained in step e) after specific mechanical processes can optionally be subjected to a forming process.

Examples of suitable forming processes are thermoforming and pressing processes. For the production of a component, the product obtained in step d) or the product obtained in step e) after specific mechanical processes can by way of example be placed into a mold and molded.

To the extent that the semifinished product used for the forming process still comprises polymerizable lactam A), and also catalyst B) and activator C), the forming process takes place under conditions under which the lactam A) and, if present, monomers M) polymerize. To this end, by way of example, the mold in which the semifinished product is molded to give the component can be heated to a temperature at which the lactam polymerizes anionically to give the polyamide. The temperature of the mold here is preferably in the range from 100 to 200° C., more preferably in the range from 120 to 180° C., and in particular in the range from 140 to 170° C.

The invention further provides the fiber-reinforced composite materials obtainable by the process of the invention.

With the aid of the process of the invention it is possible to produce fiber-reinforced composite materials with high content of fiber and, if present, of filler. In particular, the content of fibers and fillers in the fiber-reinforced composite material obtained by the process of the invention is in the range from 30 to 90% by weight, in particular from 40 to 80% by weight, preferably from 50 to 75% by weight, based on the total weight of the fiber-reinforced composite material. In one specific embodiment, the content of fibers and fillers in the fiber-reinforced composite material is in the range from 50 to 90% by weight, based on the total weight of the fiber-reinforced composite material.

Fiber-reinforced composite materials produced by the process of the invention can in particular be used as material for the production of parts of automobile bodywork, e.g. passenger compartment or wheel surround, and also of automobile parts such as cladding of frames and dashboards, and for the interior of passenger compartments. In principle, the fiber-reinforced composite materials produced by the process of the invention are suitable for all types of casings for small electrical devices, for example cellphones, laptops, iPads, or in general terms plastics products intended to imitate metal.

The non-restricting examples below and the FIGURE provides further explanation of the invention.

EXAMPLES

Example 1

ε-Caprolactam conveyed at 8.44 kg/h was mixed continuously in a static mixer at 85° C. with a solution, conveyed at 4.25 kg/h, composed of 95.2 percent by weight of ε-caprolactam and 4.8 percent by weight of sodium caprolactamate. The temperature of said mixture was controlled to 80° C. After continuous addition of 0.55 kg/h of a solution composed of 80 percent by weight of N,N'-hexamethylenebis(carbamoyl-ϵ-caprolactam) and 20 percent by weight of caprolactam, the resultant mixture was sprayed by means of a twin-fluid nozzle into a nitrogen-inertized spray tower (prilling tower). The temperature of the gas phase in the spray tower was 25° C. This gave particles of average size 160 μm.

One week later, the resultant prilled solid was injection molded at a product temperature of 80° C. in an Arburg 270 S injection molding machine with vertical injection unit. The temperature profile of the cylinder was 60/65/70/75° C., injection time 0.8 s, hold pressure time 2 s. The melt was injected into a mold heated to 150° C. Polymerization was then allowed to continue for 5 minutes. The resultant polyamide molding was removed from the mold.

Residual monomer (caprolactam) content in the polyamide product was determined chromatographically. The intrinsic viscosity of the polyamide product was determined in accordance with ISO 307 at 5° C. in 96% sulfuric acid. The resultant polymer comprised 1.1% by weight of residual caprolactam, and its intrinsic viscosity was 320.

Example 2

The solid prilled caprolactam obtained according to example 1 was applied (50% by volume) at a temperature of 23° C. onto a glass fiber mat (SE4351 woven fabric from OCV with 2/2 50/50 twill construction with weight per unit area of 600 g/m² and with linear density of 1200 tex). The composite material was pressed for 3 minutes at 150° C. and at a pressure of 10 bar in a press from Frimo, and the resultant polyamide molding was then removed from the mold.

The resultant fiber-reinforced composite material comprised 0.8% by weight of residual caprolactam, and its intrinsic viscosity was 350.

Example 3

The solid prilled caprolactam obtained according to example 1 was applied (50% by volume) at a temperature of 23° C. onto a glass fiber mat (SE4351 woven fabric from OCV with 2/2 50/50 twill construction with weight per unit area of 600 g/m² and with linear density of 1200 tex). The composite material was pressed for 2.5 minutes at 150° C. and at a pressure of 20 bar by means of a twin-belt Contilam press from Held, with a web velocity of 0.5 m/min, and the resultant polyamide molding was then removed from the mold.

The resultant fiber-reinforced composite material comprised 0.4% by weight of residual caprolactam, and its intrinsic viscosity was 320.

Example 4

The solid prilled caprolactam obtained according to example 1 was applied (50% by volume) at a temperature of 23° C. onto a carbon fiber mat (462 woven fabric from ECC-Cramer with 2/2 50/50 twill construction with a weight per unit area of 245 g/m², desized on both sides). The composite material was pressed for 2.5 minutes at 150° C. and at a pressure of 20 bar by means of a twin-belt Contilam press from Held, with a web velocity of 0.5 m/min, and the resultant polyamide molding was then removed from the mold.

The resultant fiber-reinforced composite material comprised 0.6% by weight of residual caprolactam, and its intrinsic viscosity was 350.

Example 5

The solid prilled caprolactam obtained according to example 1 was applied (50% by volume) at a temperature of 23° C. onto a basalt fiber mat (220.1270.T-22 woven fabric from Basaltex with 2/2 50/50 twill construction with weight per unit area of 225 g/m². The composite material was pressed for 2.5 minutes at 160° C. and at a pressure of 20 bar by means of a twin-belt Contilam press from Held, with a web velocity of 0.5 m/min, and the resultant polyamide molding was then removed from the mold.

The resultant fiber-reinforced composite material comprised 0.7% by weight of residual caprolactam, and its intrinsic viscosity was 290.

Example 6

The solid prilled caprolactam obtained according to example 1 was applied (50% by volume) at a temperature of 73° C. onto a glass fiber mat (SE4351 woven fabric from OCV with 2/2 50/50 twill construction with weight per unit area of 600 g/m² and with linear density of 1200 tex). The composite material was pressed for 2.5 minutes at 150° C. and at a pressure of 20 bar by means of a twin-belt Contilam press from Held, with a web velocity of 0.5 m/min, and the resultant polyamide molding was then removed from the mold.

The resultant fiber-reinforced composite material comprised 0.5% by weight of residual caprolactam, and its intrinsic viscosity was 310.

Comparative Example 1 (At Elevated Temperature and Elevated Pressure)

A commercially available PA powder from BASF was applied (50% by volume) at a product temperature of 23° C. onto a glass fiber mat (2/2 50/50 twill woven fabric with a weight per unit area of 600 g/m² and with linear density of 1200 tex). The composite material was pressed at 280° C. and at a pressure of 50 bar by means of a twin-belt Contilam press from Held, with a web velocity of 0.5 m/min, the residence time of the composite in the press being 2.5 minutes. The resultant polyamide molding was removed from the mold.

Comparative Example 2

A commercially available polyamide powder from BASF was applied and preimpregnated (50% by volume) at a product temperature of 23° C. onto a glass fiber mat (SE4351 woven fabric from OCV with 2/2 50/50 twill construction with weight per unit area of 600 g/m² and with linear density of 1200 tex). The composite material was pressed for 10 minutes at 295° C. and at a pressure of 50 bar in a press from Frimo, and then the resultant polyamide molding was removed from the mold.

The left-hand photograph in the FIGURE shows a transverse section of the fiber-reinforced composite material of comparative example 2, while the right-hand photograph shows a transverse section of the fiber-reinforced composite material of example 2 of the invention.

The right-hand photograph shows markedly better impregnation of the fibers. Complete impregnation of the individual fiber bundles was achieved, producing markedly better homogeneity of the polymer in the composite material. It was thus possible to achieve a marked improvement in mechanical properties, specifically strength and toughness.

The extent of residual pores can be reduced markedly by evacuating the caprolactam, but this has hardly any effect on mechanical properties.

The invention claimed is:

1. A process for producing a fiber-reinforced composite material with a polyamide matrix by the steps of
   a) providing a solid polymerizable composition which comprises
      A) at least one lactam,
      B) at least one catalyst, and
      C) at least one activator selected from
         i) isocyanates,
         ii) anhydrides,
         iii) acyl halides,
         iv) reaction products of the activator with A), or
         v) mixtures thereof,
   b) applying, in solid, free-flowing form, the polymerizable composition provided in the step a) onto a fiber material,
   c) subjecting the fiber material obtained following the step b) to treatment at a pressure in a range from 5 to 300 bar and at a temperature in which the mixture of components A), B), and C) can flow to enclose and penetrate the fiber material, and
   d) allowing the treated fiber material product obtained in the step c) to cool.

2. The process according to claim 1, further comprising
   e) subjecting the product obtained in the step d) to mechanical processes.

3. The process according to claim 2, further comprising
   f) subjecting the product obtained in the step e) to a forming process.

4. The process according to claim 1, further comprising
   f) subjecting the product obtained in the step d) to a forming process.

5. The process according to claim 1, where the polymerizable composition provided in the step a) comprises
   from 50 to 99.7 parts by weight of at least one lactam A),
   from 0.2 to 8.0 parts by weight of at least one catalyst B), and
   from 0.1 to 3.6 parts by weight of at least one activator C), based on the total weight of the composition.

6. The process according to claim 1, where the polymerizable composition provided in the step a) comprises at least one lactam A) selected from ε-caprolactam, 2-piperidone, 2-pyrrolidone, caprylolactam, enantholactam, laurylolactam, laurolactam, or any one mixture thereof.

7. The process according to claim 1, where the polymerizable composition provided in the step a) comprises at least one catalyst B) selected from sodium caprolactamate, potassium caprolactamate, magnesium bromide caprolactamate, magnesium chloride caprolactamate, magnesium biscaprolactamate, sodium hydride, sodium, sodium hydroxide, sodium methanolate, sodium ethanolate, sodium propanolate, sodium butanolate, potassium hydride, potassium, potassium hydroxide, potassium methanolate, potassium ethanolate, potassium propanolate, potassium butanolate, or any one mixture thereof.

8. The process according to claim 1, where the polymerizable composition provided in the step a) comprises at least one activator C) selected from hexamethyl diisocyanate, isophorone diisocyanate, hexamethylenedioyl bromide, hexamethylenedioyl chloride, or any one mixture thereof.

9. The process according to claim 1, where the polymerizable composition provided in the step a) consisting consists of components A), B), and C).

10. The process according to claim 1, where the polymerizable composition provided in the step a) takes the form of particles with an average diameter in a range from 1 to 2000 μm.

11. The process according to claim 1, where the components A), B), and C) of the step a) are combined in liquid form at elevated temperature, the combined components are mixed, and the mixture is hardened by cooling.

12. The process according to claim 11, where the time from combining components A), B), and C) in liquid form to hardening is from 1 millisecond to 10 minutes.

13. The process according to claim 11, where the combining of components A), B), and C) is conducted at a temperature that is a1: most 20° C. above the melting point of said mixture.

14. The process according to claim 11, where the combining of the polymerizable composition in the step a) includes
   separately melting components A), B), and C) and then combining, or
   a first melt made of the catalyst B) and of at least one lactam A), a second melt made of the activator C) and of at least one lactam A), and optionally, in addition, a third melt made of at least one lactam A) are combined, and
   mixing the combined components.

15. The process according to claim 1, where the providing the polymerizable composition in the step a) comprises the following steps:
   a1) mixing of components A), B), and C) at a temperature which is the same as or higher than the melting point of a resulting mixture of components A), B), and C),
   a2) converting the resulting mixture into droplet form,
   a3) cooling of the droplets obtained in the step a2) to a temperature at least 10° C. below the melting point of the mixture; and
   a4) optionally granulation of the cooled mixture.

16. The process according to claim 1, where the fiber material of the step b) comprises continuous-filament fibers, or consists of continuous-filament fibers.

17. The process according to claim 1, where the fiber material of the step b) is selected from fiber bundles, woven fabrics, knitted fabrics, laid scrims, or nonwovens, and in each made of continuous-filament fibers.

18. The process according to claim 1, where the treatment in the step c) takes place under conditions under which the lactam A) polymerizes to at least 97.5 wt % completion.

19. The process according to claim 18, where the temperature in the step c) is in the range from 80 to 250° C.

20. The process according to claim 18, where the product obtained in the step c) has at most 5% by weight residual content of lactam A), based on the weight of the lactam A) in the polymerizable composition used in step a).

21. The process according to claim 1, where the treatment in the step c) takes place under conditions so the lactam A) does not polymerize to completion.

22. The process according to claim 21, where the treatment in the step c) takes place at a temperature of from 1 to 20° C. above the melting point of the mixture of components A), B), and C).

23. The process according to claim 21, where the product obtained in the step c) has at most 50% by weight content of polymeric components, based on the total weight of the polymerizable compounds in the solid polymerizable composition used in step a).

* * * * *